United States Patent
Wasilewski

(10) Patent No.: US 10,184,449 B2
(45) Date of Patent: Jan. 22, 2019

(54) VERTICAL-AXIS WIND TURBINE WITH FLETTNER ROTORS

(71) Applicant: HOUSE OF INVENTORS SP. ZO.O, Lomianki (PL)

(72) Inventor: Jerzy Boleslaw Wasilewski, Lomianki (PL)

(73) Assignee: HOUSE OF INVENTORS SP. ZO.O., Lomianki (PL)

( * ) Notice: Subject to any disclaimer, the term of this patent is extended or adjusted under 35 U.S.C. 154(b) by 893 days.

(21) Appl. No.: 14/417,153

(22) PCT Filed: Jun. 25, 2013

(86) PCT No.: PCT/EP2013/063315
§ 371 (c)(1),
(2) Date: Jan. 25, 2015

(87) PCT Pub. No.: WO2014/001358
PCT Pub. Date: Jan. 3, 2014

(65) Prior Publication Data
US 2015/0204305 A1   Jul. 23, 2015

(30) Foreign Application Priority Data

Jun. 26, 2012 (PL) .......................................... 399678
Mar. 29, 2013 (EP) ...................................... 13161860

(51) Int. Cl.
| | |
|---|---|
| *F03D 3/00* | (2006.01) |
| *F03D 3/02* | (2006.01) |
| *H02K 7/18* | (2006.01) |
| *F03D 15/00* | (2016.01) |

(52) U.S. Cl.
CPC ............... *F03D 3/007* (2013.01); *F03D 3/02* (2013.01); *F03D 15/00* (2016.05); *H02K 7/183* (2013.01); *Y02E 10/74* (2013.01)

(58) Field of Classification Search
CPC ....................................................... F03D 3/007
USPC ....................................................... 416/4, 90
See application file for complete search history.

(56) References Cited

U.S. PATENT DOCUMENTS

| | | |
|---|---|---|
| 2007/0160472 A1 | 7/2007 | Jobmann |
| 2011/0001323 A1 | 1/2011 | Douglas |
| 2014/0008916 A1 * | 1/2014 | Shimizu .................. F03D 9/002 290/55 |

FOREIGN PATENT DOCUMENTS

| | | | | |
|---|---|---|---|---|
| GB | 2471272 | 12/2010 | | |
| GB | 2471272 A | * 12/2010 | ............... | B63H 9/02 |

* cited by examiner

*Primary Examiner* — Richard A Edgar
(74) *Attorney, Agent, or Firm* — Mark M. Friedman

(57) ABSTRACT

A wind turbine of a VAWT type (Vertical Axis Wind Turbine) having axis of rotation substantially perpendicular to the wind direction, with Flettner rotors (7) having axes substantially parallel to the axis of rotation of the turbine, said Flettner rotors (7) arranged in a rotary body of the turbine, the turbine having an inner cylinder (6) situated between the Flettner rotors (7), said inner cylinder (6) rotating in the direction opposite to the direction of rotation of said rotary body and Flettner rotors (7). The cylinder (6) is situated at a distance from the rotors (7) such that its rotary motion causes an increase of a pressure difference on sides of the rotors (7), resulting from the Magnus effect.

7 Claims, 5 Drawing Sheets

Wind direction

VERTICAL-AXIS WIND TURBINE WITH FLETTNER ROTORS

TECHNICAL FIELD

The subject of the present invention is a Vertical Axis Wind Turbine (VAWT) having an axis of rotation substantially perpendicular to the wind direction, with Flettner rotors having axis of rotation substantially parallel to the axis of rotation of the turbine, intended for generating electricity.

BACKGROUND ART

The term "Flettner rotor" is to be understood here as a rotary cylinder utilizing a Magnus effect. The Magnus effect causes formation of a lift acting on a rotating cylinder when it is located in a stream of air, said lift acting perpendicularly to the direction of this stream.

From a publication DE102005001235A1 there is known a Horizontal Axis Wind Turbine (HAWT) having axis of rotation substantially parallel to the wind direction, with Flettner rotors, namely a Flettner windmill. Generating by the rotor a force oriented perpendicularly to the wind direction and to the rotor axis —as a result of pressure difference on the sides of the rotor (Magnus effect) is known and used in the art, mainly to drive ships.

There is also known from the publication WO2007/076825 a VAWT with Flettner rotors, which on the leeward side of the turbine rotate in different direction than on the windward side.

There are also known other similar solutions, in which Flettner rotors do not rotate on the leeward side or are covered then by special covering elements, which move on special trolleys (publication DE000004033078A1) or where a special mechanism turns the rotors by 180° (according to publication DE102010026706A1).

Another known solution according to publication DE 102010008061 A1 (US2011/0198857A1) comprises rotors moving along a plane tilted with respect to the horizontal line and returning on the leeward side on bearings attached to a toothed belt. A spinning motion of rotors is provided by a non-moving toothed belt, on which gears mounted on the rotors axles roll.

There are also known wind turbines with Flettner rotors of axes substantially parallel to the turbine rotation axis, arranged within a rotary body of the turbine, which turbines have inner cylinder arranged between Flettner rotors, wherein said inner cylinder rotates in the direction opposite to direction of rotation of said rotary body. However, in these turbines the inner cylinder acts as a support, and the distance between the inner cylinder and the Flettner rotors is relatively large, therefore the rotation of the inner cylinder does not affect the pressure difference on the sides of the rotors. Turbines of this type are known from publications JP2008175070, WO2007076825, BE898634.

It would be advisable to further improve the construction of wind turbines with use of Flettner rotors.

DISCLOSURE OF THE INVENTION

A wind turbine, according to the invention, consists of a rotary body, on the circumference of which are located said Flettner rotors, a central cylinder placed in the middle, very close to the rotors, rotating substantially in the opposite direction, and a base (a tower) with vertical axis, providing support in bearings for the rotary body and the central cylinder. The central cylinder rotates during the operation in the direction opposite to the direction of rotation of the rotary body. The base comprises a stationary wheel controlling the Flettner rotors and central cylinder drive gears and said gears, as well as a generator with a gear and components of an electrical system and other controlling means. The term "stationary wheel" is understood here as a wheel not rotating during the operation of the turbine and driven (rotating) only during the start-up. Direction of wind does not affect the operation of the turbine.

According to the invention, a wind turbine of a VAWT type (Vertical Axis Wind Turbine) having axis of rotation substantially perpendicular to the wind direction, with Flettner rotors having axes substantially parallel to the axis of rotation of the turbine, said Flettner rotors arranged in a rotary body of the turbine, the turbine having an inner cylinder situated between the Flettner rotors, said inner cylinder rotating in the direction opposite to the direction of rotation of said rotary body and Flettner rotors, is characterised in that the cylinder is situated at a distance from the rotors such that its rotary motion causes an increase of a pressure difference on sides of the rotors, resulting from the Magnus effect.

Preferably, a distance (A) between the surfaces of the rotor and of the inner cylinder on a line (z) perpendicularly connecting their axes of rotation provides a non-laminar air flow between the surfaces of the rotor and of the cylinder on the line (z) during the motion of the rotor from a line tangent to the wind direction (t) to a line perpendicular to the wind direction (p), wherein lines (t) and (p) intersect the axis of rotation of the rotary body.

Preferably, the distance (A) equals preferably from 0.005 to 0.05 of the diameter of the rotor.

Preferably, the inner cylinder has openings covered by light flaps, which can open to the inside of the cylinder in the moment of moving through an area of higher pressure by the surface of the cylinder.

Preferably, the inner cylinder rotates with the speed selected such that its circumferential speed is substantially equal to the circumferential speed of the Flettner rotors.

Preferably, in the base there is situated a substantially non-moving stationary wheel having a rotation axis common with the rotary body, controlling the gears of the drive of the Flettner rotors and of the inner cylinder.

Preferably, each of the Flettner rotors is driven—through a transmission —by a stationary wheel, using its apparent movement with respect to the rotary body.

Preferably, the inner cylinder is driven—through a transmission—by a stationary wheel, using its apparent movement with respect to the rotary body.

Preferably, the turbine is started up by inducing rotation of the inner cylinder.

Preferably, the turbine is started up by inducing rotation of the stationary wheel.

The solution according to the invention should allow efficient use of wind energy, as well as smaller threat to birds and less noise than conventional devices serving this purpose. A densely arranged series of devices according to the invention can form an effective shield protecting from the wind from a constant (to a certain degree) direction.

BRIEF DESCRIPTION OF DRAWINGS

The object of the invention in exemplary embodiments is shown on a drawing, in which.

MODES FOR CARRYING OUT THE INVENTION

Figure 1:
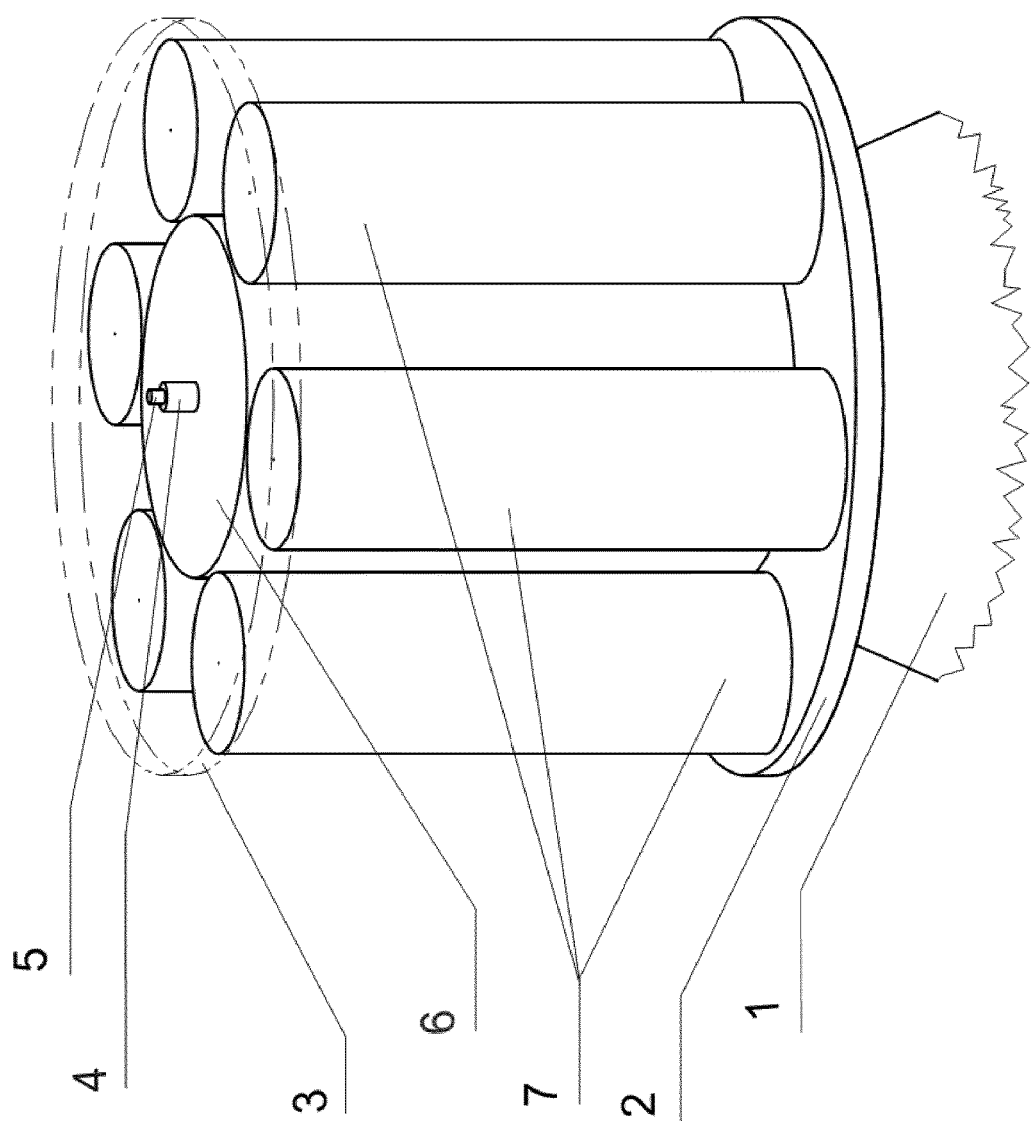
FIG. 1 shows a schematic arrangement of turbine components.

In FIG. 1 a rotary body of the turbine, mounted on a base (tower) 1, consists of substantially two discs: a lower one 2 and an upper one 3 (which has been shown as translucent to improve the readability of the drawing). The discs 2, 3 are connected by a shaft in form of a tube 4, said shaft 4 being supported in bearings on the bottom and at the top on an axle 5, said axle 5 being attached non-movingly to the base. The axle 5 substantially does not require a support on its upper end—other solutions are also possible.

Within the rotary body there is a central cylinder 6 and for example six Flettner rotors 7 of axles supported in bearings in discs 2, 3. The rotors 7 are situated on the periphery of the rotary body evenly, at a suitable distance from each other, providing undisturbed creation of moving air layers by the surface of the rotors 7.

The axis of the rotary body of the turbine is set vertically, and thus perpendicularly to the wind direction. During the operation (after the start-up) the rotary body rotates with a relatively low speed. The Flettner rotors 7 spin in the same direction, but with much higher speed—such that the linear speed on the surface of rotor 7 is at least four times greater than the greatest anticipated useful speed of the wind. Such speed is required for achieving a full effectiveness of rotors 7. The wind (from any direction) acts simultaneously on least two rotors 7 and generates a force in a peripheral direction of the rotary body. By the term "peripheral direction" it is meant here a direction substantially parallel to the one which is tangent to the periphery of the rotary body. On the leeward side of the rotary body the air does not move in the radial direction.

The central cylinder 6, situated between the rotors 7, rotates in the direction opposite to the whole rotary body with the Flettner rotors 7. The cylinder 6 has the rotation axis common with the rotary body and can be supported in bearings on the outside of the shaft 4 (which is a part of the body). The central cylinder 6 has a diameter larger than the rotors 7, and the distance between the cylinder 6 and each rotor 7 is significantly smaller than between the rotors 7, such that the moving air layer between the central cylinder 6 and the rotor 7 is uniform. The rotors 7 can have flanges on both ends (preventing the air layer from slipping from the ends), which can overlap the top and the bottom side of the central shaft 6. The rotational speed of the cylinder 6 should be selected so as not to increase friction of the air layer. The motion of the central cylinder 6 causes an additional increase of pressure difference on sides of the rotor 7, resulting from the Magnus effect. Moreover, the central shaft 6 can have flaps opening to the inside or holes letting a part of the flowing air inside. The endings of the cylinder 6 should then allow for its outflow (construction with spokes).

Figure 2:
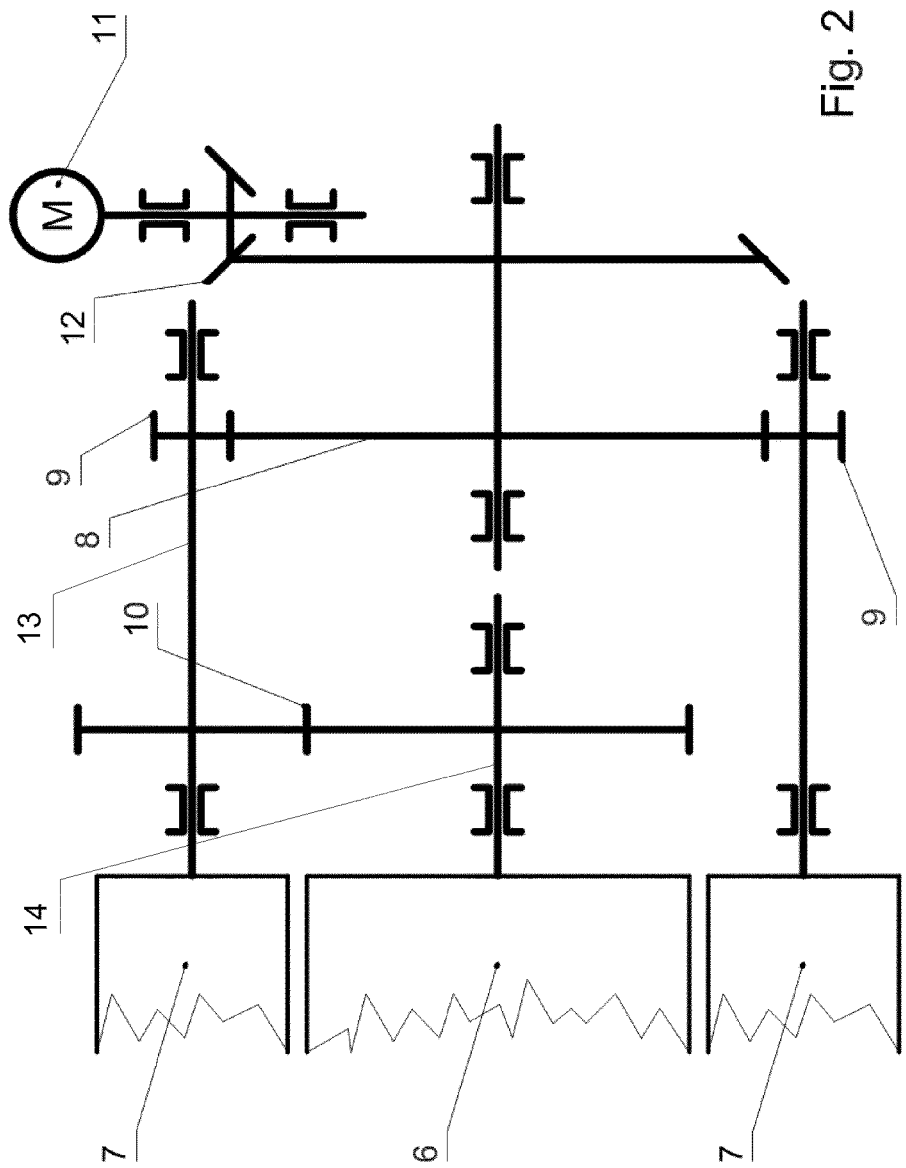
FIG. 2 shows a drive layout for rotating elements present in this embodiment.

As shown in FIG. 2, presenting a drive layout, the Flettner rotors 7 are driven by a stationary gear wheel 8, which is during the operation blocked non-movably, cooperating with pinions 9 on the Flettner rotors axles.

The power feed of the central shaft 6 takes place—as shown in FIG. 2—from at least one of the Flettner rotors 7 via a gear 10. The start-up of the turbine occurs with a help of a small electric drive 11—as shown in FIG. 2—connected by a reduction gear 12 with the stationary wheel 8, rotating said wheel 8 in the direction opposite to the rotations of the rotary body, which causes the rotation of the rotors 7 by a non-moving rotary body. The electric drive 11 can also—in a variant of the embodiment—rotate only the central cylinder 6 through a free wheel mechanism, which should cause a pressure difference between the sides of each rotor 7 sufficient to start-up the turbine on idling running. After the start-up, during the operation, the stationary wheel 8 ceases to be driven and does not rotate.

Figure 3:
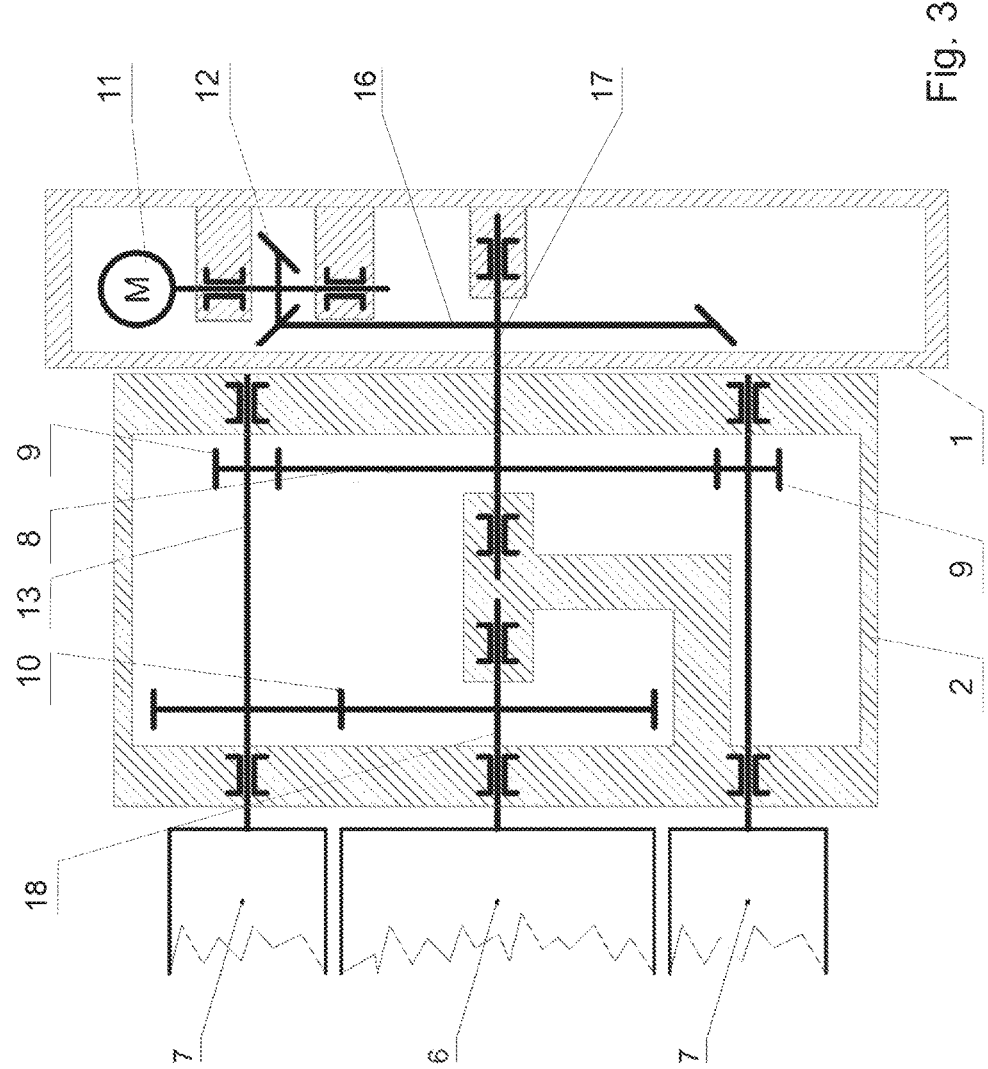
FIG. 3 shows an exemplary location of drive components with respect to the rotary body and the base.

FIG. 3 shows an exemplary arrangement of drive components with respect to the base 1 and the lower disc 2. The drive 11 with the reduction gear 12 are situated in the non-moving base 1. The stationary wheel 8 is situated on a shaft 17, the same one on which a gear wheel 16 of a reduction gear 12 is mounted. The shaft 17 is supported in bearings from one side in the base 1, and from the second side in the lower disc 2. The shafts 13 of the rotors 7 are supported in bearings in the lower disc 2 according to the drawing, just as a shaft 18 of the central cylinder 6.

Figure 4:
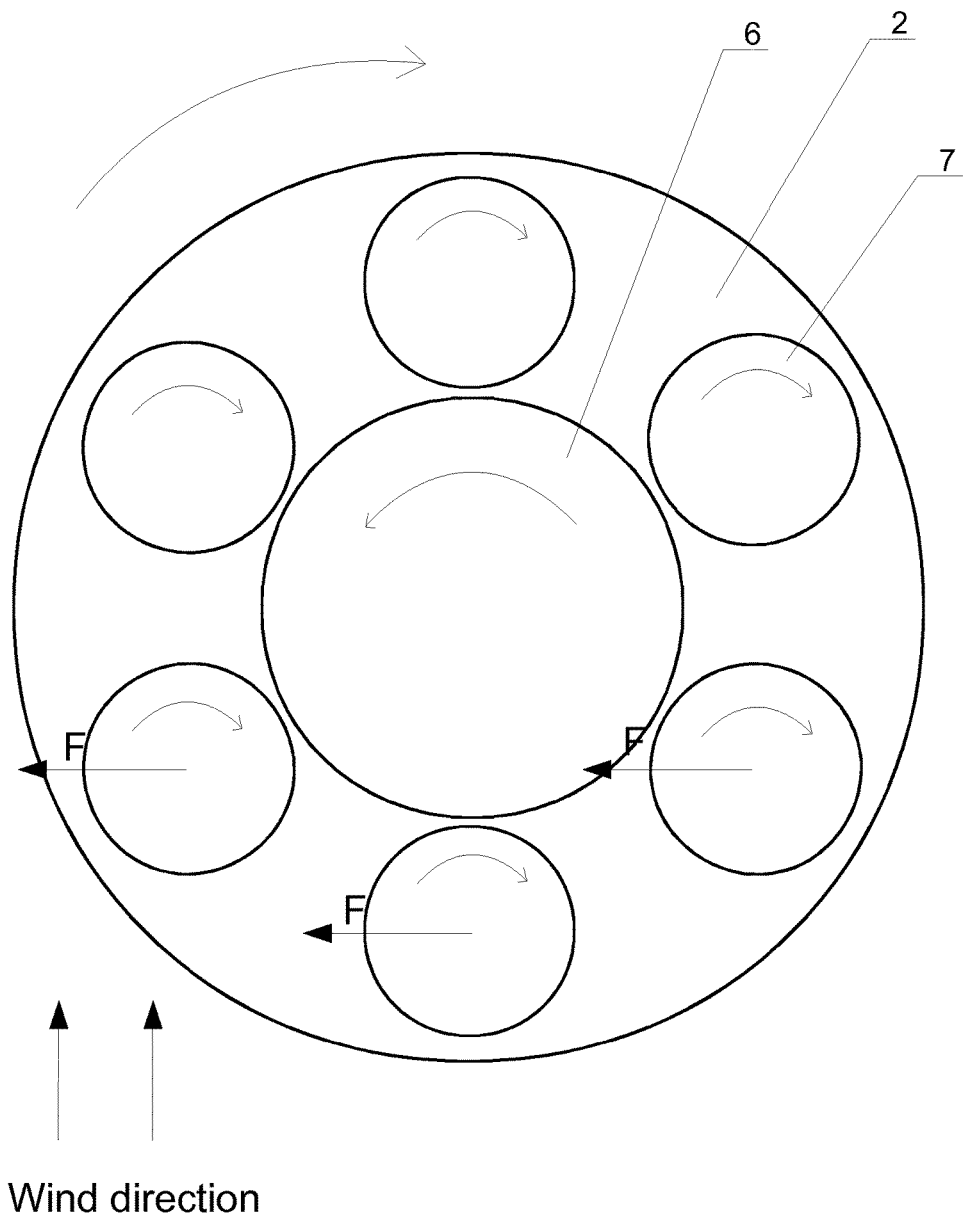
FIG. 4 shows a schematic top view of the rotary body.

FIG. 4 shows a layout of the directions of rotation of individual elements. The device can also operate when each of the elements rotates in the direction opposite to the one shown in the layout.

Figure 5:
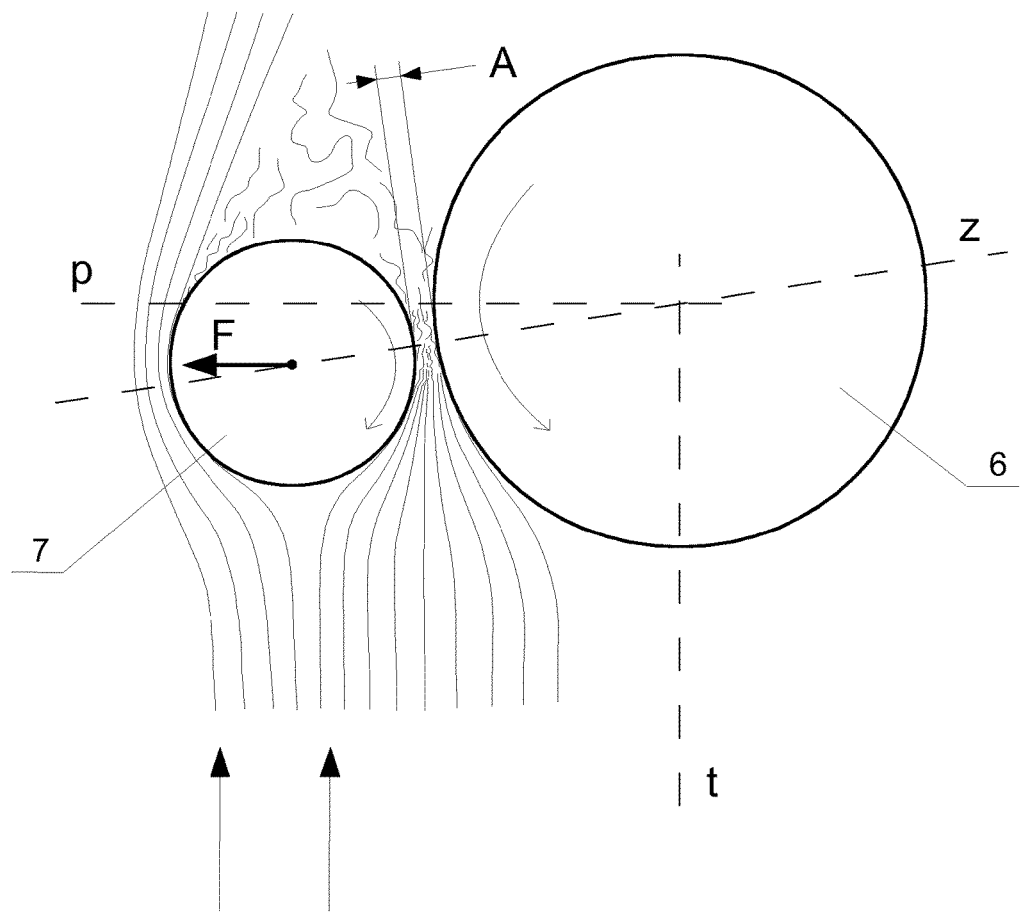
FIG. 5 shows an exemplary flow of the air between one of the rotors and the central cylinder.

FIG. 5 shows a schematic drawing of the inner cylinder 6 with one of the rotors 7 in a top view. In the drawing there is shown the rotor 7 moving with the wind as a result of the rotation of the rotary body. The air-flow flows onto the front surface of the rotor 7 and spreads along this surface around it. The rotor 7 rotates for example clockwise. If it rotates in the opposite direction, then the phenomenon described below occurs on the other side of the rotary body. In a certain distance from the rotor 7 there is situated the inner cylinder 6, rotating in a direction opposite to rotation of the rotor 7. A distance (A) between the surfaces of the rotor 7 and the inner cylinder 6 on a line (z) perpendicularly connecting their rotation axes ensures during the motion of the rotor 7 substantially with the wind a non-laminar air flow by the surface of the rotor 7 by the inner cylinder 6 on the line (z). It is assumed here that the rotor 7 moves with the wind, when it is in a phase of the circulation around the axis of the rotary body substantially from the line tangent to the wind direction (t) to the line perpendicular to the wind direction (p), wherein both lines intersect the axis of rotation of the rotary body. The relative speed of the air and the surface of the rotor 7 is here higher than on the other side of the rotor 7. The flow of the air between the surfaces of the rotor 7 and the cylinder 6 is of much more turbulent nature and is hindered because of the overlapping turbulences from the rotor 7 and the inner cylinder 6, thus there is formed area of a pressure higher than on the other side of the rotor 7, where the air flow is of less turbulent nature or of laminar nature. It results in an intensification of the Magnus effect and as a result, in a formation of a greater lift. Behind the line perpendicular to the wind direction hitherto operating rotor 7 in no longer directly subjected to the action of the wind, resulting from covering it by the next rotor 7. Whereas, on the other side of the line tangent to the wind direction (t), between the rotor 7 and the inner cylinder 6, more uniform air layer is formed.

A generator for generating the electric energy can be situated for example in the base 1 of the turbine. In can be coupled with the lower disc 2 using a toothed ring embedded on its periphery, which with help of common transmission means will allow for transferring the rotations of the body onto the shaft of the generator. The Flettner rotors 7 and the central cylinder 6 can be made of preferably a styrofoam covered by a laminate.

Exemplary speeds of rotary elements can be as follows:
rotational speed of rotors—such that circumferential speed of the rotor is at least 4× maximal speed of the wind in the area of the turbine placement,
rotational speed of the cylinder—such that the circumferential speed of the cylinder is substantially equal to circumferential speed of the rotor.
rotational speed of the rotary body—maximally such that the apparent wind caused by the motion of the rotor would not exceed a half of the wind speed.

The inner cylinder 6 can have, for example, a diameter of 2 m, while the rotors 7 are of diameter 1 m and the height of the inner cylinder 6 and the rotors 7 being 5 m.

In other embodiment of the turbine according to the invention a typical windmill tower can be used as a support structure, placing the rotary body horizontally, but perpendicularly to the wind direction. On the far end of the axle there can be placed a support bearing, mounted on an extension connected with the rotatable tower tip. Also two rotary bodies can be mounted on the opposite sides of the rotary part of the tower.

From the typical embodiment of a wind turbine it can also be used a mechanism for setting the turbine (placed horizontally) in respect to the wind direction, generator with a gear (possible transmission change) and further elements of electrical system.

The whole issue of the drive of the elements and the start-up of the turbine can be solved in any other way, according to the art. For example—the power transmission can occur first from the rotary body onto the central cylinder through a multiplying planetary gear, and then further onto the Flettner rotors through a belt transmission.

The turbine set vertically does not require a mechanism for setting it according to the wind direction.

The invention claimed is:

1. A vertical axis wind turbine having an axis of rotation substantially perpendicular to the wind direction, with Flettner rotors having axes substantially parallel to the axis of rotation of the turbine, said Flettner rotors being arranged in a rotary body of the turbine, the turbine having an inner cylinder situated between the Flettner rotors, said inner cylinder being rotatable in the direction opposite to the direction of rotation of said rotary body and Flettner rotors, wherein the inner cylinder is situated at a distance (A) from the rotors such that the rotary motion of the inner cylinder causes an increase of a pressure difference on sides of the rotors, resulting from the Magnus effect and wherein a base of the vertical axis wind turbine comprises a substantially non-moving stationary wheel having a rotation axis common with the rotary body, controlling gears of a drive of the Flettner rotors and of the inner cylinder.

2. The wind turbine according to claim 1, wherein the distance (A) between the surfaces of the rotor and of the inner cylinder on a line (z) perpendicularly connecting their axes of rotation ensures a non-laminar air flow between the surfaces of the rotor and of the inner cylinder on the line (z) during the motion of the rotor from a line tangent to the wind direction (t) to a line perpendicular to the wind direction (p), wherein tangent line (t) and the perpendicular line (p) intersect the axis of rotation of the rotary body.

3. The turbine according to claim 2, wherein the distance (A) has a length from 0,005 to 0,05 of the length of the diameter of the rotor.

4. The wind turbine according to claim 1, wherein the inner cylinder is rotatable with a speed adjustable such that its circumferential speed is substantially equal to the circumferential speed of the Flettner rotors.

5. The wind turbine according to claim 1, wherein each of the Flettner rotors is driven through a transmission by the substantially non-moving stationary wheel, using its apparent movement with respect to the rotary body.

6. The wind turbine according to claim 1, wherein the inner cylinder is driven through a transmission by the substantially non-moving stationary wheel, using its apparent movement with respect to the rotary body.

7. The wind turbine according to claim 1, wherein the turbine can be started by inducing rotation of the inner cylinder.

* * * * *